(12) United States Patent
Griffin et al.

(10) Patent No.: US 6,248,447 B1
(45) Date of Patent: Jun. 19, 2001

(54) CUTTING ELEMENTS AND METHODS OF MANUFACTURE THEREOF

(75) Inventors: Nigel Dennis Griffin, Whitminster; Malcolm Roy Taylor, Gloucester, both of (GB)

(73) Assignee: Camco International (UK) Limited, Stonehouse (GB)

( * ) Notice: Subject to any disclaimer, the term of this patent is extended or adjusted under 35 U.S.C. 154(b) by 0 days.

(21) Appl. No.: 09/390,074

(22) Filed: Sep. 3, 1999

(51) Int. Cl.$^7$ ..................................................... E21B 10/12
(52) U.S. Cl. ............................................. 428/408; 175/434
(58) Field of Search ............................... 428/408; 175/434

(56) References Cited

U.S. PATENT DOCUMENTS

| | | |
|---|---|---|
| 4,263,618 | 4/1981 | Hara et al. . |
| 4,525,179 | 6/1985 | Gigl . |
| 4,643,741 * | 2/1987 | Yu et al. ............................. 51/295 |
| 4,690,691 | 9/1987 | Komanduri . |
| 4,719,979 | 1/1988 | Jones . |
| 4,726,718 | 2/1988 | Meskin et al. . |
| 4,976,324 | 12/1990 | Tibbitts . |
| 4,995,887 | 2/1991 | Barr et al. . |
| 5,025,874 | 6/1991 | Barr et al. . |
| 5,027,912 | 7/1991 | Juergens . |
| 5,061,293 | 10/1991 | Barr et al. . |
| 5,560,716 * | 10/1996 | Tank et al. ............................. 384/492 |
| 5,766,394 * | 6/1998 | Anderson et al. ................. 156/89.11 |

FOREIGN PATENT DOCUMENTS

| | | |
|---|---|---|
| 0 156 264 | 10/1985 | (EP) . |
| 0 157 278 | 10/1985 | (EP) . |
| 0 350 045 | 1/1990 | (EP) . |
| 0 546 725 | 6/1993 | (EP) . |
| 0 554 568 | 8/1993 | (EP) . |
| 1 349 385 | 4/1974 | (GB) . |
| 4-74766 | 3/1992 | (JP) . |
| 4-114966 | 4/1992 | (JP) . |

OTHER PUBLICATIONS

Translated Abstract of JP 4–47466 obtained electronically from Derwent World Patents Index, via the Dialog Corporation, on May 3, 2000.
Translated Abstract of JP 4114966 obtained electronically from Derwent World Patents Index, via the Dialog Corporation, on May 3, 2000.

* cited by examiner

Primary Examiner—Daniel Jenkins
(74) Attorney, Agent, or Firm—Jeffery E. Daly

(57) ABSTRACT

A cutting element for a rotary drill bit includes at least one insert of polycrystalline diamond of a kind incorporating a carbonate as a sintering binder-catalyst. The insert is mounted by being at least partly surrounded by a support body of conventional polycrystalline diamond of a kind incorporating a sintering binder-catalyst selected from cobalt and other iron group elements or alloys thereof. The insert and support body may be integrally bonded to a substrate during manufacture. Either the insert or support body may be pre-sintered or sintered during formation of the cutting element.

19 Claims, 2 Drawing Sheets

Fig. 1
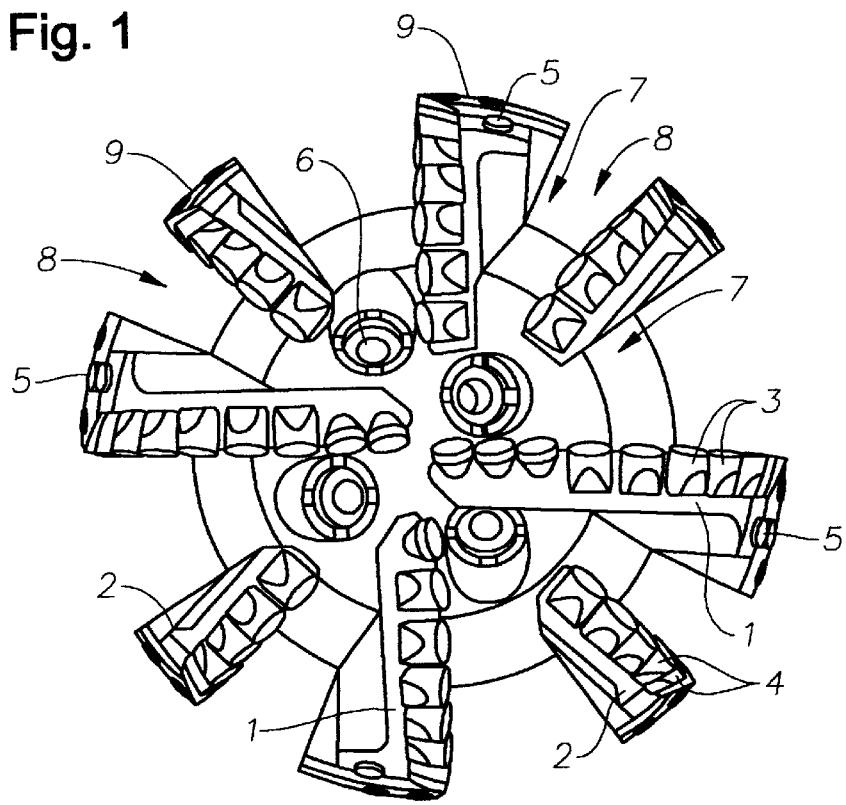
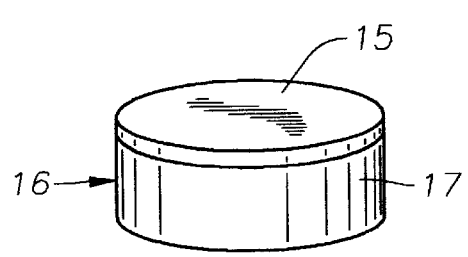
Fig. 2
(Prior Art)
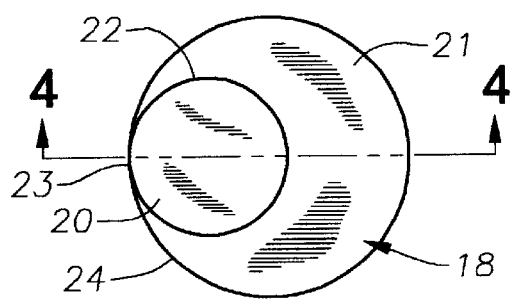
Fig. 3
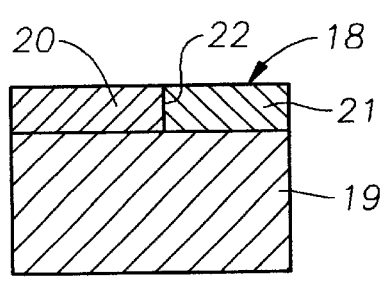
Fig. 4
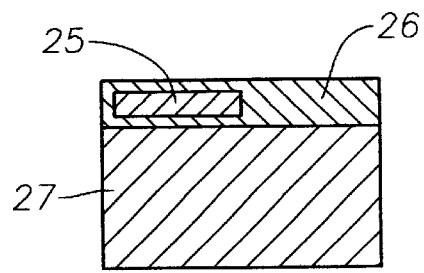
Fig. 5

CUTTING ELEMENTS AND METHODS OF MANUFACTURE THEREOF

BACKGROUND OF THE INVENTION

1. Field of the Invention

The invention relates to cutting elements and in particular to cutting elements for rotary drill bits, such as drag-type drill bits and rolling cutter drill bits. However, the invention may also be applicable to the manufacture of cutting elements for use in machine tools and the like.

2. Description of the Related Art

As is well known, one common form of cutting element for a rotary drag-type drill bit is a two-layer or multi-layer cutting element where a facing table of polycrystalline diamond is integrally bonded to a substrate of less hard material, such as tungsten carbide. The cutting element is usually in the form of a tablet, usually circular or part-circular. The substrate of the cutting element may be brazed to a carrier, usually also of cemented tungsten carbide, which is received in a socket in the bit body, or the substrate itself may be of sufficient axial length to be mounted directly in a socket in the bit body.

As is well know, polycrystalline diamond is formed by sintering diamond powder with a suitable binder-catalyst in a high pressure, high temperature press. Hitherto, the polycrystalline diamond employed in cutting elements for rotary drill bits has been of three basic types.

In the most common type, which will hereinafter be referred to as "conventional" polycrystalline diamond, the binder-catalyst is cobalt. In one common process for manufacturing two-layer cutting elements, diamond powder is applied to the surface of a preformed tungsten carbide substrate incorporating cobalt. The assembly is then subjected to very high temperature and pressure in a press. During this process cobalt migrates from the substrate into the diamond layer and acts as a binder-catalyst, causing the diamond particles to bond to one another with diamond-to-diamond bonding, and also causing the diamond layer to bond to the substrate.

Although cobalt is most commonly used as the binder-catalyst, any iron group element, such as cobalt, nickel or iron, or alloys thereof, may be employed.

The disadvantage with such conventional polycrystalline diamond is that the material is not thermally stable beyond about 750° C., due to the presence of the metallic binder, which causes the diamond to graphitize. Also, the difference in coefficient of thermal expansion of the diamond and cobalt may also cause deterioration of the diamond layer with increase in temperature above about 500° C.

In order to overcome these problems, so-called "thermally stable" polycrystalline diamond components have been produced and are sometimes used in drag-type drill bits. In one type of thermally stable diamond the cobalt or other binder-catalyst in conventional polycrystalline diamond is leached out of the diamond after formation. While this may increase the heat-resistance of the diamond to about 1200° C., the leaching process also removes the cemented carbide substrate which leads to severe difficulties in mounting such material on a drill bit.

In an alternative form of thermally stable diamond, silicon carbide is used as the binder-catalyst. Again, the thermal resistance of the diamond is improved, but again difficulties are encountered in mounting the material for use on a drag-type drill bit.

More recently, a further type of polycrystalline diamond has become available in which carbonates, such as powdery carbonates of Mg, Ca, Sr, and Ba, or two or more types of these carbonates, are used as the binder-catalyst when sintering the diamond powder. Polycrystalline diamond materials of this kind are described, for example, in Japanese Patent Laid-Open Publications Nos. 74766/1992 and 114966/1992, the contents of which are incorporated herein by reference.

Polycrystalline diamond of this type has significantly greater wear-resistance and hardness than the types of polycrystalline diamond hitherto used as cutting elements in drill bits. The material is difficult to produce on a commercial scale since much higher temperatures and pressures are required for sintering than is the case with conventional and thermally stable polycrystalline diamond. One result of this is that the bodies of polycrystalline diamond produced by this method are smaller than conventional polycrystalline diamond elements. This, together with other characteristics of the material makes it difficult to mount bodies of the material in such a way that they may be used as cutting elements in rotary drill bits.

The present invention sets out to overcome these problems and to provide novel arrangements and methods for mounting polycrystalline diamond of this kind in a manner where the material may be used in cutting elements for rotary drill bits.

SUMMARY OF THE INVENTION

According to the invention there is provided a cutting element including at least one insert of polycrystalline diamond of a kind incorporating a carbonate as a sintering binder-catalyst, said insert being at least partly surrounded by a support body of polycrystalline diamond of a kind incorporating a sintering binder-catalyst selected from iron group elements or alloys thereof.

The insert and support body may each be in the form of a tablet having a front surface, a rear surface and a peripheral surface. Preferably the front surface of each of the insert and support body is substantially parallel to the rear surface thereof. Preferably also a part of the peripheral surface of the insert forms a continuation of the peripheral surface of the support body.

The thickness of the insert, between the front and rear surfaces thereof, may be substantially the same as the thickness of the support body, so that the front surface of the insert is substantially co-planar with the front surface of the support body and the rear surface of the insert is substantially co-planar with the rear surface of the support body.

In an alternative embodiment said insert is totally embedded in the support body, so that no part of the insert is exposed. In this case the front surface of the insert may be inclined to the front surface of the support body.

In another embodiment there are provided a plurality of inserts embedded in a larger support body.

In any of the above arrangements according to the invention the rear surface of the support body may be bonded to a surface of a substrate of a material which is less hard than the support body.

The invention also provides a cutting element comprising at least one body of polycrystalline diamond of a kind incorporating a carbonate as a sintering binder-catalyst, the body having a front surface, a rear surface and a peripheral surface, and the rear surface of the body being bonded to a surface of a substrate of a material which is less hard than the material of the body.

The invention further provides a method of forming a cutting element including at least one insert of polycrystalline diamond of a kind incorporating a carbonate as a sintering binder-catalyst, said insert being at least partly surrounded by a support body of polycrystalline diamond of a kind incorporating a sintering binder-catalyst selected from iron group elements or alloys thereof, the method comprising the steps of:

pre-sintering said insert in a high pressure, high temperature press, at least partly surrounding the pre-sintered insert with a mixture including diamond powder and binder-catalyst selected from iron group elements or alloys thereof, and subjecting the pre-sintered insert and the powder mixture to high pressure and high temperature in a press to sinter the mixture and bond it to the pre-formed insert.

An alternative method comprises the steps of:

pre-sintering the insert in a high pressure, high temperature press, separately pre-sintering the support body in a high pressure, high temperature press, combining the pre-sintered insert and support body together in an assembly where the support body at least partly surrounds the insert, and subjecting the assembly to high pressure and temperature in a press to bond the insert to the support body.

A further alternative method comprises the steps of:

forming a first mixture including diamond powder and a powdered carbonate binder-catalyst, forming a second mixture including diamond powder and a powdered binder-catalyst selected from iron group elements or alloys thereof, disposing bodies of said mixtures so that the second mixture at least partly surrounds the first mixture, and subjecting the mixtures to high pressure and high temperature in a press to sinter the first and second mixtures and bond them to one another.

A still further alternative method comprises the steps of:

pre-sintering the support body in a high pressure, high temperature press, forming a mixture including diamond powder and a powdered carbonate binder-catalyst, combining the mixture with the pre-sintered support body to form an assembly in which the support body at least partly surrounds the mixture, and subjecting the assembly to high pressure and temperature in a press to sinter the insert and to bond the insert to the pre-sintered support body.

Each of the above methods may include the further step of applying the insert and support body, either pre-sintered or as a mixture including diamond powder and binder-catalyst, to a preformed substrate prior to subjecting the whole assembly to high pressure and temperature in a press, so that the insert and support body are bonded to the substrate.

In methods where the support body is sintered while in contact with the substrate, as opposed to being pre-sintered, the necessary iron group binder-catalyst may be derived from the substrate instead of, or in addition to, being mixed with the diamond powder applied to the substrate.

Accordingly, the invention also provides a method comprising the steps of:

pre-sintering said insert in a high pressure, high temperature press, preforming a substrate incorporating a sintering binder-catalyst selected from iron group elements or alloys thereof, forming an assembly by applying to a surface of the substrate said pre-sintered insert and a body including diamond powder in such manner that the diamond powder at least partly surrounds the insert, and subjecting the assembly to high pressure and high temperature in a press, to cause some of said sintering binder-catalyst incorporated in the substrate to migrate from the substrate into the body of diamond powder, whereby the diamond powder is sintered and bonded to both the substrate and to the insert, and the insert is also bonded to the substrate.

A further method comprises the steps of:

forming a mixture including diamond powder and a powdered carbonate binder-catalyst, preforming a substrate incorporating a sintering binder-catalyst selected from iron group elements or alloys thereof, forming an assembly by applying to a surface of the substrate a body of said mixture and a body including diamond powder in such manner that the body including diamond powder at least partly surrounds the body of said mixture, and subjecting the assembly to high pressure and high temperature in a press to sinter the mixture and bond it to the substrate, and to cause some of said sintering binder-catalyst incorporated in the substrate to migrate from the substrate into the body of diamond powder, whereby the diamond powder is sintered and bonded to both the substrate and to the sintered mixture.

The invention further provides a method of forming a cutting element comprising at least one body of polycrystalline diamond of a kind incorporating a carbonate as a sintering binder-catalyst, the body having a front surface, a rear surface and a peripheral surface, and the rear surface of the body being bonded to a surface of a substrate of a material which is less hard than the material of the body, the method including the steps of:

pre-sintering the insert and preforming the substrate, locating a surface of the insert in contact with a surface of the substrate, and subjecting the insert and substrate to high pressure and temperature in a press to bond the insert to the substrate.

Alternatively the method may include the steps of:

preforming a substrate, placing in contact with the substrate a mixture including diamond powder and a powdered carbonate binder-catalyst, and subjecting the mixture and substrate to high pressure and temperature in a press to sinter the mixture to form the insert, and to bond the insert to the substrate.

In any of the methods according to the invention, the mixtures or bodies of powder from which the insert or support body are sintered may include other additives in powder form, in addition to the necessary diamond powder and sintering binder-catalyst.

BRIEF DESCRIPTION OF THE DRAWINGS

The following is a more detailed description of embodiments of the invention, by way of example, reference being made to the accompanying drawings in which:

FIG. 1 is a diagrammatic end view of the leading face of a typical drag-type drill bit of the general kind in which cutting elements according to the present invention may be applied.

FIG. 2 is a diagrammatic perspective view of a typical prior art polycrystalline diamond cutting element.

FIG. 3 is a plan view of one form of cutting element in accordance with the present invention.

FIG. 4 is a section on the Line 4—4 of FIG. 3.

FIG. 5 is a similar section of an alternative arrangement.

DETAILED DESCRIPTION OF THE PREFERRED EMBODIMENTS

Figure 6:
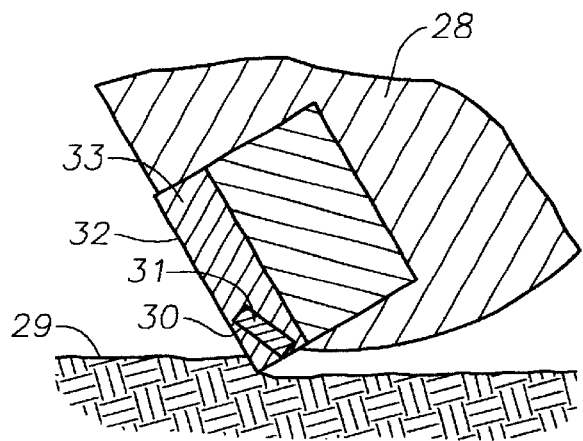
FIG. 6 is a sectional view of a further form of cutting element according to the invention, mounted on a drill bit.

Referring to FIG. 1, the drill bit comprises a bit body on which are formed four primary blades 1 and four secondary blades 2. The blades extend generally radially with respect to the bit axis.

The leading edges of the secondary blades are substantially equally spaced with respect to one another, but the leading edge of each secondary blade is closer to its associated preceding primary blade than it is to the following primary blade.

Primary cutters 3 are spaced apart side-by-side along each primary blade 1 and secondary cutters 4 are spaced apart side-by-side along each secondary blade 2. Each secondary cutter 4 is located at the same radial distance from the bit axis as an associated one of the primary cutters on the preceding primary blade.

Each cutter 3, 4 is generally cylindrical and of circular cross-section and comprises a front facing table of polycrystalline diamond bonded to a cylindrical substrate of cemented tungsten carbide. Each cutter is received within a part-cylindrical pocket in its respective blade.

The primary cutters 3 are arranged in a generally spiral configuration over the drill bit so as to form a cutting profile which sweeps across the whole of the bottom of the borehole being drilled. The three outermost cutters 3 on each primary blade 1 are provided with backup studs 5 mounted on the same primary blade rearwardly of the primary cutters. The backup studs may be in the form of cylindrical studs of tungsten carbide embedded with particles of synthetic or natural diamond.

The bit body is formed with a central passage (not shown) which communicates through subsidiary passages with nozzles 6 mounted at the surface of the bit body. Drilling fluid under pressure is delivered to the nozzles 6 through the internal passages and flows outwardly through the spaces 7 between adjacent blades for cooling and cleaning the cutters. The spaces 7 lead to junk slots 8 through which the drilling fluid flows upwardly through the annulus between the drill string and the surrounding formation. The junk slots 8 are separated by gauge pads 9 which bear against the side wall of the borehole and are formed with bearing or abrasion inserts (not shown). This is just one example of a rotary drag-type drill bit, and many other designs are in use and will be known to those skilled in the art.

The bit body and blades may be machined from metal, usually steel, which may be hardfaced. Alternatively the bit body, or a part thereof, may be molded from matrix material using a powder metallurgy process. The methods of manufacturing drill bits of this general type are well known in the art and will not be described in detail.

FIG. 2 shows a typical prior art cutting element in which conventional polycrystalline diamond is normally used. The polycrystalline diamond comprises the facing table 15 of a two-layer circular cylindrical cutting element 16 of generally tablet-like form. The diamond facing table 15 is integrally bonded to a significantly thicker substrate 17 of cemented tungsten carbide.

As previously mentioned, such preform cutting elements are manufactured by applying to the surface of the substrate 17 a layer of diamond powder, the substrate and diamond layer then being subjected to extremely high pressure and temperature in a press. During the formation process, cobalt from the substrate 17 migrates into the diamond layer and acts as a catalyst, resulting in the diamond particles bonding together and to the substrate.

FIGS. 3 and 4 show one form of cutting element in accordance with the present invention. As in the conventional prior art arrangement, the cutting element comprises a polycrystalline diamond facing table 18 bonded to a substrate 19. However, in accordance with the present invention the facing table 18 incorporates a generally circular insert 20 comprising polycrystalline diamond of the kind previously referred to incorporating a carbonate as the sintering binder-catalyst. The carbonate binder-catalyst may typically comprise a powdery carbonate of Mg, Ca, Sr, or Ba, or combinations of two or more of these powdery carbonates.

The insert 20 is partly surrounded by a body 21 of conventional polycrystalline diamond, that is to say polycrystalline diamond where the binder-catalyst comprises cobalt or some other iron group element, such as iron or nickel, or an alloy thereof.

The surrounding body 21 is generally crescent-shaped and co-extensive with the substrate 19. The insert 20 has a peripheral surface 22 which is circular and a portion 23 of which forms a continuation of the outer periphery 24 of the surrounding body 21 and is thus exposed at the periphery of the diamond table so as to form the cutting edge of the cutting element. In use, therefore, the cutting element is so orientated on the drill bit that it is the portion 23 of the insert 20 which acts on the formation being cut.

The cutting element shown in FIGS. 3 and 4 may be manufactured in a number of different ways, according to the invention.

In a preferred method the insert 20 is pre-sintered. That is to say, the insert is preformed by mixing powdered diamond with the desired carbonate binder-catalyst, also in powdered form, and the mixture is packed into an appropriately shaped can and is then subjected to extremely high pressure and temperature in a press. Typically, the pressure is at least 7.7 GPa and the temperature 2000° C. This sintering binds the diamond particles together with diamond-to-diamond bonding to produce an extremely hard and wear-resistant insert.

The preformed insert 20 is then placed in the appropriate position on the upper surface of the preform substrate 19, for example of cemented tungsten carbide incorporating a cobalt binder-catalyst, and a layer of diamond powder is then applied to the upper surface of the substrate 19, around the insert 20, in the configuration shown in FIGS. 3 and 4, the whole assembly being located in a suitably shaped can. The assembly is then subjected to high temperature and pressure in a press, the order of temperature and pressure being that which is normally used in the manufacture of conventional polycrystalline diamond. During this process cobalt migrates from the substrate 19 into the diamond powder and acts as a binder-catalyst to effect diamond-to-diamond bonding in the layer so as to produce the body of polycrystalline diamond 21, and also serves to bond the diamond layer 21 to the substrate. The sintering process also serves to bond the insert 20 to the substrate 19 and also to the surrounding conventional polycrystalline diamond layer 21.

The body of diamond powder which forms the conventional polycrystalline diamond body 21 may consist solely of diamond. However, it may also include a proportion of other powdered additives. For example, it may include powdered cobalt or other binder-catalyst to supplement the binder-catalyst which migrates from the substrate.

In the finished component the surrounding body 21 of conventional polycrystalline diamond mechanically holds the insert 20 in addition to the bonding of the insert to the substrate and surrounding body.

Although cemented tungsten carbide is commonly used for the material of the substrate, it will be appreciated by those skilled in the art that other materials may be used, such as tungsten/tungsten carbide composites. Other iron group elements, or alloys thereof, may also be used as the binder-catalyst.

In a second method of manufacturing the cutting element, both the insert 20 and the crescent-shaped surrounding body 21 are both pre-sintered in separate processes before being applied to the substrate 19 for bonding together in the press. In this case, in order to pre-sinter the crescent-shaped body 21, the powdered diamond from which it is formed requires to be mixed with powdered cobalt, or other iron group metal, to act as the binder-catalyst, since, during the pre-sintering, the substrate is not present to provide the migration of cobalt into the diamond powder.

In a third alternative method both the bodies of material 20 and 21 are applied as powders to the preform substrate 19 and are sintered simultaneously and bonded to the substrate 19 in a single press operation. In this case, of course, the body of diamond powder which is to form the insert 20 is mixed with the appropriate carbonate binder-catalyst while the diamond powder which is to form the surrounding body 21 is either mixed with a powdered cobalt or other iron group catalyst, and/or derives its binder-catalyst by migration of the material from the substrate 19.

In a fourth method according to the invention, only the crescent-shaped surrounding body 21 is pre-sintered. The insert 20 is then formed by filling the circular aperture in the surrounding body 21 with a powdered mixture including diamond and carbonate binder-catalyst before the whole assembly is subjected to high pressure and temperature in the press so as to sinter the material to form the insert 20 and bond it to the preformed surrounding body 21 and substrate 19. The body 21 may be pre-sintered alone in the required crescent-shape and subsequently applied to the substrate 19 for the second press operation, or may be sintered while already applied to the substrate 19 so as to use cobalt migration from substrate as the binder-catalyst.

FIG. 5 shows an alternative form of cutting element according to the invention in which the insert 25 incorporating a carbonate binder-catalyst is totally embedded in the surrounding body 26 of conventional polycrystalline diamond using an iron group binder-catalyst. In this case the cutting element can, in practice, only be manufactured by the first method referred to above whereby the insert 25 is pre-sintered and embedded in a layer of diamond powder which is then sintered and bonded to the substrate 27 in a subsequent press operation.

FIG. 6 shows a modified version of the cutting element shown in FIG. 5, the cutting element being shown mounted on a drill bit 28 and engaging the formation 29. In this case the front face 30 of the insert 31 is inclined to the front face 32 of the surrounding body 33 of conventional polycrystalline diamond. During initial use of the cutter the effective negative back rake of the cutter is determined by the angle of the front face 32 of the conventional polycrystalline diamond part of the cutter. As this layer wears away the insert 31 becomes exposed and engages the formation 29 directly. Due to the difference in angle between the front face of the insert 31 and the conventional diamond layer 32, the insert 31 operates on the formation at a greater negative back rake angle, which may be more appropriate for the conditions at that time.

In the arrangements previously described the diamond facing table, comprising the insert and surrounding body, has been described as bonded to a substrate. However, arrangements are also possible where the diamond table is not integrally bonded to a substrate but consists of polycrystalline diamond alone.

Figure 7:
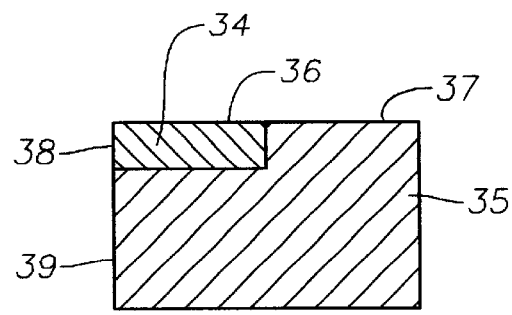
FIGS. 7–9 are sections through further forms of cutting elements according to the present invention.

FIG. 7 shows such an arrangement. In this case the insert 34 of polycrystalline diamond using a carbonate catalyst binder is of lesser thickness than the body 35 of conventional polycrystalline diamond, so as to extend only partly through the thickness of the surrounding layer. As in the previous arrangements, the insert 34 may be generally circular in shape and located within a correspondingly shaped recess in the surrounding body 35, the front surface 36 of the insert being co-planar with the front surface 37 of the surrounding body and part of the peripheral surface 38 of the insert forming a continuation of the peripheral surface 39 of the surrounding body.

Although the inserts have been described as essentially circular in shape, they may be of any other suitable shape.

Figure 8:
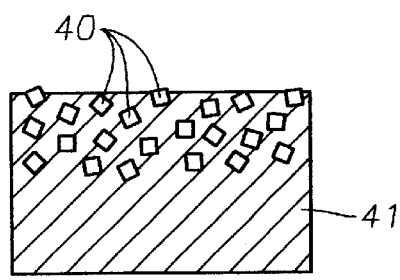

FIG. 8 shows an embodiment where a number of smaller bodies 40 of polycrystalline diamond using a carbonate binder-catalyst are embedded within and at the surface of a larger body 41 of conventional polycrystalline diamond using an iron group catalyst.

In arrangements where the support body of conventional polycrystalline diamond is not bonded to a substrate, as shown for example in FIG. 7, the body of diamond powder which forms this material must be sintered from a mixture which also includes, in powdered form the necessary binder-catalyst selected from iron group elements, or alloys thereof, since in this case there is no substrate from which the binder-catalyst can migrate into the body of diamond powder. The body 35 of conventional polycrystalline diamond may be separately pre-sintered or may be sintered at the same time as it is bonded to the insert 34 in the press. Similarly, the insert 34 may be separately pre-sintered or sintered at the same time as it is bonded to the body of conventional polycrystalline diamond 35. Thus, the component of FIG. 7 may be formed by any of four methods corresponding essentially to the four methods described in relation to FIGS. 3 and 4, except that in each case the substrate is omitted.

In arrangements where the body of polycrystalline diamond is not integrally bound to a substrate, the cutting element may, after formation, be mounted on a substrate, or carrier, or directly on the bit body, by brazing.

Since polycrystalline diamond cannot normally be wetted by brazing alloy, the cutting element is then preferably formed with a metallic coating prior to the brazing operation. For example, the surface of the cutting element may be treated by any known process which creates carbide on the surface of the element so as to permit brazing.

Figure 9:
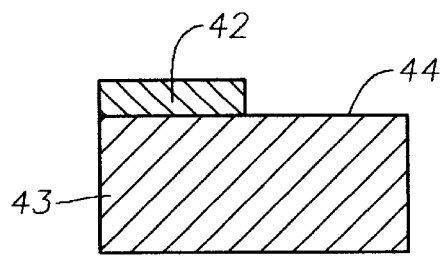

A further form of cutting element in accordance with the invention is shown in FIG. 9. In this case the body 42 of polycrystalline diamond incorporating a carbonate binder-catalyst is bonded directly to a substrate 43 without being wholly or partly surrounded by conventional polycrystalline diamond. The bonding is effected by applying the insert to the front surface 44 of the substrate and submitting the assembly to very high pressure and temperature in a press.

In this case the insert 42 may be pre-sintered and applied to the preformed substrate as a solid body, or may be applied to the surface of the substrate as a layer of diamond powder incorporating the appropriate carbonate powder so that sintering of the insert 42 occurs at the same time as the insert is bonded to the substrate 43.

In the arrangements specifically described above, there is shown a plain interface between the insert and the surrounding body, and between each of these two components and the substrate. As is well known, the bond between components of a two-layer or multi-layer polycrystalline diamond element may be enhanced by providing between the components a non-planar, configured interface, i.e. where the bonded surfaces of the components are formed with inter-engaging projections and recesses. In elements according to the present invention, therefore, such configured interfaces may be provided between the insert and the surrounding body of conventional polycrystalline diamond, and/or between either component and the substrate in cases where the element includes a substrate.

Whereas the present invention has been described in particular relation to the drawings attached hereto, it should be understood that other and further modifications, apart from those shown or suggested herein, may be made within the scope and spirit of the present invention.

What is claimed:

1. A cutting element including at least one insert of polycrystalline diamond incorporating a carbonate selected from the group consisting of Mg carbonate, Ca carbonate, Sr carbonate, Ba carbonate, and mixtures thereof, as a sintering binder-catalyst, said insert being at least partly surrounded by a support body of polycrystalline diamond incorporating a sintering binder-catalyst selected from iron group elements or alloys thereof.

2. A cutting element according to claim 1 wherein the insert and support body are each in the form of a tablet having a front surface, a rear surface and a peripheral surface.

3. A cutting element according to claim 2 wherein the front surface of each of the insert and support body is substantially parallel to the rear surface thereof.

4. A cutting element according to claim 2 wherein a part of the peripheral surface of the insert forms a continuation of the peripheral surface of the support body.

5. A cutting element according to claim 2 wherein the front surface of the insert is substantially co-planar with the front surface of the support body.

6. A cutting element according to claim 2 wherein the rear surface of the insert is substantially co-planar with the rear surface of the support body.

7. A cutting element according to claim 2 wherein the thickness of the insert, between the front and rear surfaces thereof, is substantially the same as the thickness of the support body.

8. A cutting element according to claim 2, wherein the peripheral surface of the insert is at least partly circular.

9. A cutting element according to claim 2 wherein the peripheral surface of the support body is at least partly circular.

10. A cutting element according to claim 1 wherein a portion of the insert is exposed at a surface of the support body.

11. A cutting element according to claim 1 wherein said insert is totally embedded in the support body, so that no part of the insert is exposed.

12. A cutting element according to claim 11 wherein each of the insert and support body is in the form of a tablet having a front surface, a rear surface and a peripheral surface.

13. A cutting element according to claim 11 wherein the front surface of each of the insert and support body is substantially parallel to the rear surface thereof.

14. A cutting element according to claim 12 wherein the front surface of the insert is inclined to the front surface of the support body.

15. A cutting element according to claim 1 wherein there are provided a plurality of inserts embedded in a larger support body.

16. A cutting element according to claim 2 wherein the rear surface of the support body is bonded to a surface of a substrate of a material which is less hard than the support body.

17. A cutting element according to claim 16 wherein the insert and the support body form a combined body which is substantially co-extensive with the substrate.

18. A cutting element according to claim 16 wherein the rear surface of the insert is coplanar with the rear surface of the support body and is also bonded to said surface of the substrate.

19. A cutting element comprising at least one body of polycrystalline diamond incorporating a carbonate selected from the group consisting of Mg carbonate, Ca carbonate, Sr carbonate, Ba carbonate, and mixtures thereof, as a sintering binder-catalyst, the body having a front surface, a rear surface and a peripheral surface, and the rear surface of the body being bonded to a surface of a substrate of a material which is less hard than the material of the body, said body being at least partly surrounded by a support body of polycrystalline diamond incorporating a sintering binder-catalyst selected from iron group elements or alloys thereof.

* * * * *